Figure 1:
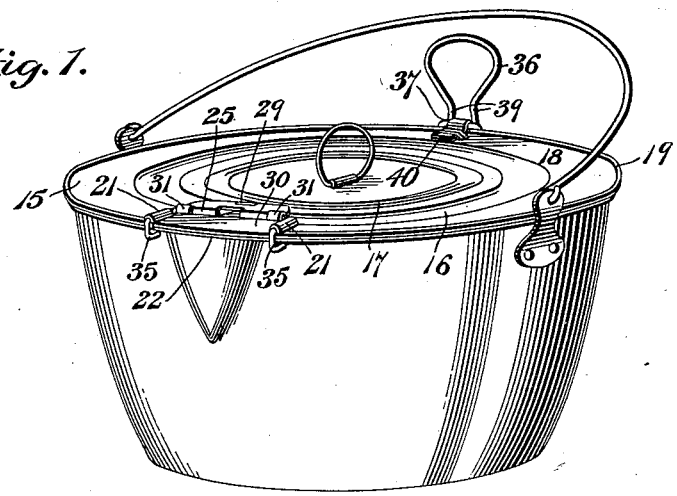

No. 674,569. Patented May 21, 1901.
J. H. WILSON.
COVER FOR COOKING VESSELS.
(Application filed Feb. 28, 1900.)
(No Model.) 2 Sheets—Sheet 1.

Witnesses
Edwin G. McKee.
W. H. Beruhof

John H. Wilson, Inventor
By C. G. Siggers, Attorney

THE NORRIS PETERS CO., PHOTO-LITHO., WASHINGTON, D. C.

No. 674,569. Patented May 21, 1901.
J. H. WILSON.
COVER FOR COOKING VESSELS.
(Application filed Feb. 28, 1900.)
(No Model.) 2 Sheets—Sheet 2.
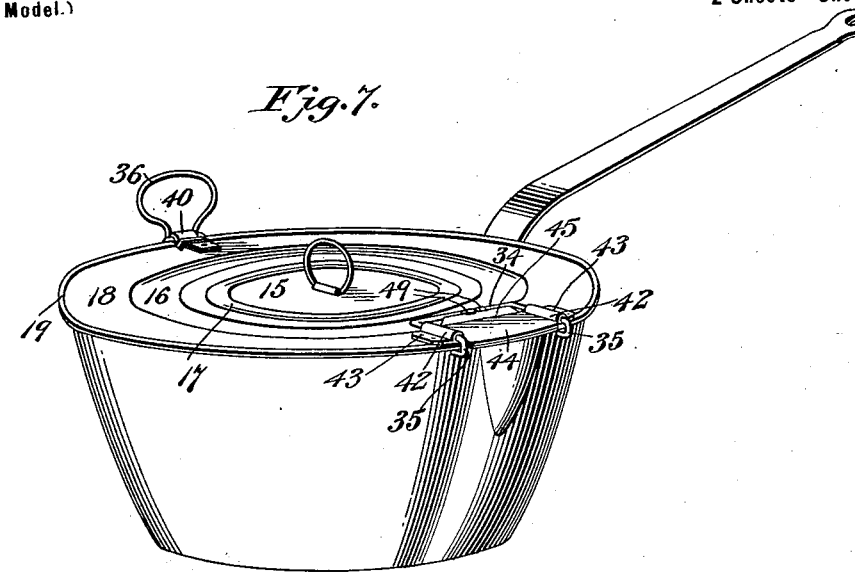
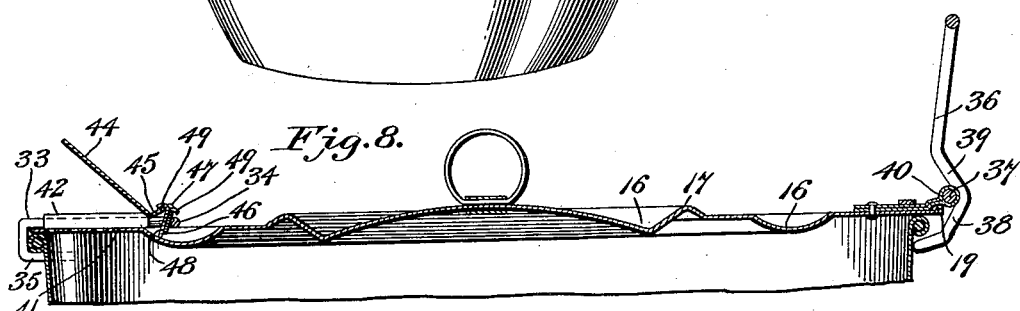
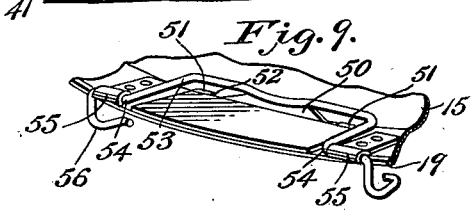
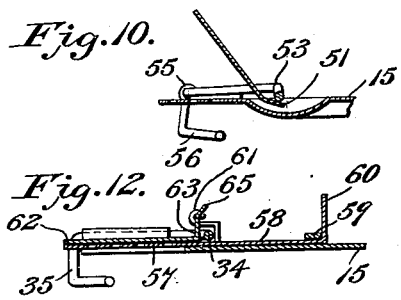
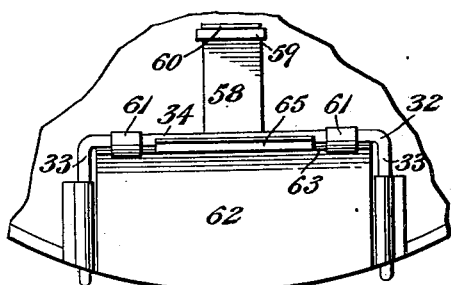
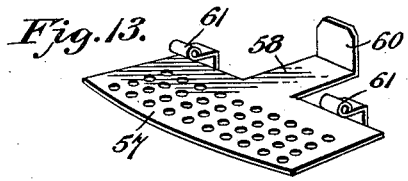
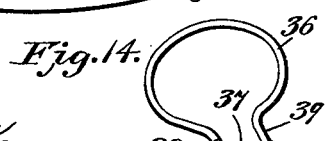
Witnesses
Edwin H. McKee
N. H. Beruhof
John H. Wilson
Inventor
By E. G. Siggers
Attorney
THE NORRIS PETERS CO., PHOTO-LITHO., WASHINGTON, D. C.

UNITED STATES PATENT OFFICE.

JOHN H. WILSON, OF LEMONT, ILLINOIS.

COVER FOR COOKING VESSELS.

SPECIFICATION forming part of Letters Patent No. 674,569, dated May 21, 1901.

Application filed February 28, 1900. Serial No. 6,828. (No model.)

*To all whom it may concern:*

Be it known that I, JOHN H. WILSON, a citizen of the United States, residing at Lemont, in the county of Cook and State of Illinois, have invented a new and useful Cover for Cooking Vessels, of which the following is a specification.

My invention relates to improvements in covers for cooking vessels; and one object in view is to provide a cover for all kinds of cooking vessels, particularly adapted for service on any kind of cooking vessel or saucepan with or without a spout or lip and in which food is cooked in heated water.

The cover of my invention is especially advantageous for service on standard makes of cooking vessels, nearly all of which have a bead or round edge at the top, over which the cover lies.

My cover is used independently of the handle or bail of the vessel, which enables the cover to be applied universally to the standard sizes of vessels to be found in the market.

A further object of the invention is to provide a cover with means for draining off the liquid contents of the vessel, while also making provision for closing the draining-orifices to confine the steam in the vessel, said cover being securely held in position on the vessel when it is tilted and the closure for the drain-orifices being thrown to its open position automatically by a slidable movement of the cover itself.

A further object is to provide a cover with a strainer and a closure therefor, said parts being adapted to be simultaneously thrown to an open position by direct manipulation of the hand, although the closure may be lifted and the movable strainer locked in a closed position by devices which coöperate with the cover on a slidable adjustment thereof.

Further objects and advantages of the invention will appear in the course of the subjoined description, and the novelty in the combination of parts and in the construction and arrangement of parts will be defined by the claims.

In the accompanying drawings I have represented a cover for cooking vessels which embodies the several features of my invention in their preferred form, and to these drawings I shall now refer in order to explain more clearly the nature of the invention and the manner in which the same is or may be carried into effect.

Figure 2:
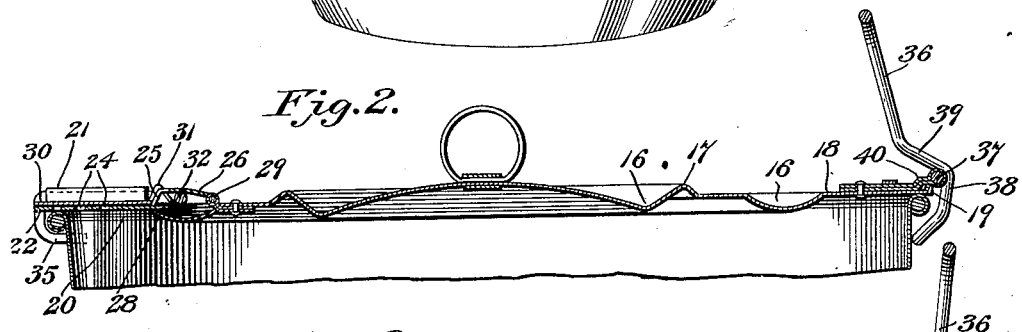
Figure 3:
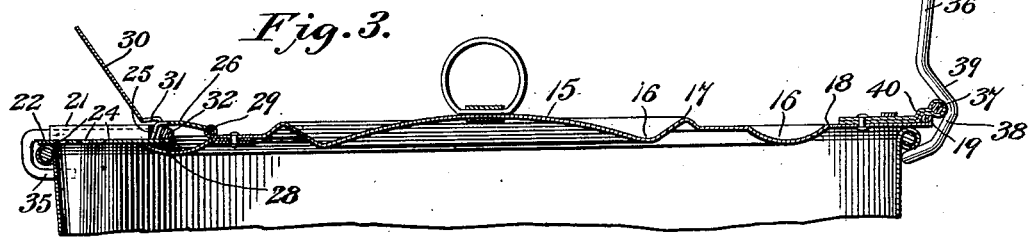
Figure 4:
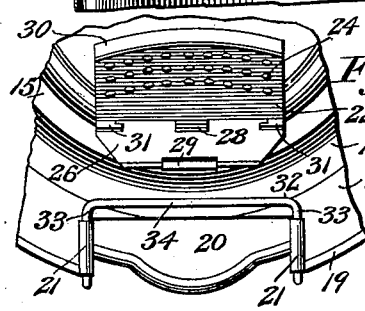
Figure 5:
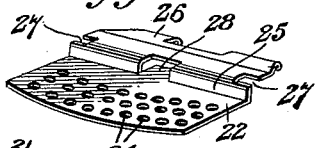
Figure 6:
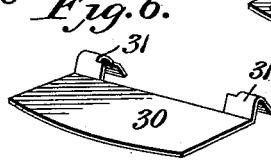

Figure 1 is a perspective view of my improved cover applied to a cooking-kettle. Fig. 2 is a transverse section with the strainer and the closure-plate therefor adjusted to their closed positions. Fig. 3 is another sectional view of the cover with the strainer locked in its closed position and the hinged closure-plate thrown back to its open position. Fig. 4 is a view of the cover with the strainer and the closure-plate in their open positions. Fig. 5 is a detail perspective view of the strainer-plate. Fig. 6 is a like view of the closure-plate. Fig. 7 is a perspective view of another embodiment of the cover applied to a saucepan, and Fig. 8 is a cross-section through said cover with the closure-plate in its raised position. Fig. 9 is another perspective view of a portion of the cover embodying still another construction contemplated by this invention, and Fig. 10 is a cross-section thereof. Fig. 11 is a plan view of a portion of a cover embodying still another construction falling within the scope of the generic features of this invention. Fig. 12 is a cross-section of the device shown by Fig. 11. Fig. 13 is a detail perspective view of the slidable strainer contemplated by the construction of Figs. 11 and 12. Fig. 14 is a detail view of the cover adjusting and clamping handle.

The same numerals of reference are used to indicate like and corresponding parts in each of the several figures of the drawings.

The cover 15 is shown by the drawings as provided with the depressions 16, separated by an intervening bead 17 and having a flat marginal portion 18, the edge of which is folded, as at 19; but the cross-sectional contour of the cover is not material. Hence the detailed form and the dimensions of the cover may be varied within wide limits. It is my purpose to manufacture the cover of such diameter as to fit the standard sizes of such cooking vessels as are known by the names of "kettles," "saucepans," and the like, such cover being particularly adapted to vessels having pouring-lips at one side thereof for the purpose of conveniently emptying the contents of the vessel.

The cover of my invention is essentially provided with a strainer, an imperforate closure for such strainer, and means coöperating with the cover for moving the imperforate closure to an open position by a slidable movement which is imparted to the cover itself, such slidable movement being given to the cover by a handle adapted to be operated without burning the hands of the operator and to serve as a means for clamping the cover upon the cooking vessel.

The generic features of the invention as herein outlined are susceptible of modification within certain limits, such as by making the strainer integral or movable with respect to the cover itself, by the employment of different forms of actuating-yoke, and by detailed constructions of the strainer and the closure-plate.

Various modifications contemplated by this invention are shown by the accompanying drawings, and I will first proceed to describe the preferred embodiment, which is represented by Figs. 1 to 6, inclusive.

The cover 15 is provided in its flat section 18 with an opening or slot 20, which is preferably of the rectangular form shown, said slot opening through the edge of the cover at a point opposite to the application or connection of the handle 36 to the cover. This slot is punched in the cover at the period of manufacturing the same by suitable dies, and fragments are left integral with the cover, so as to project into the slot, such fragments being bent upon the cover to produce the parallel loops or guides 21, which are situated at opposite ends of the slot. The strainer-plate 22 is made in a separate piece from the cover itself, and a portion of this plate is formed with a plurality of perforations 24, which constitute the drain-openings when the strainer rests flat upon and is clamped to the cover. This strainer-plate is provided in rear of its perforated portion with an inclined offset flange 25, and the rear portion of the plate is extended beyond this flange, as at 26, to provide for the proper hinge connection of the strainer-plate to the cover, as at 29. The offset flange or the extended part 26 of the strainer-plate has the notches 27 formed in its edges, and said plate is furthermore provided with a locking-tongue 28, which is formed by punching out a portion of the offset flange 25, so that the tongue will lie in the plane of the perforated part of the strainer-plate.

I employ a hinged closure-plate 30, adapted to rest upon the strainer-plate, so as to close the perforated portion thereof, and this closure-plate has a hinged connection with the strainer-plate, so as to be adjustable with the latter when it is turned on its hinged connection 29 with the cover; but at the same time this closure-plate is capable of a limited independent movement on the strainer-plate. Said closure-plate is provided with angular arms 31 at its rear edge, which arms are fitted in the notches 27 and are adapted to turn on the edges afforded by the inclined offset flange 25. These angular arms, fitting loosely in the notches of the offset flanged strainer-plate, operate to pivotally or hingedly connect the closure-plate to the strainer-plate, and the free ends of the said angular arms are disposed in the path of a yoke 32. This yoke is preferably made of a single piece of metal, which is bent or otherwise fashioned to form the parallel side bars 33, the cross-bar 34, and the hooks 35. The side bars are connected at one end by the cross-bar, while the hooks are formed at the free ends of the side bars so as to depend from the latter. The yoke is mounted on the cover by fitting its side bars loosely in the guides or loops 21 in a manner for the yoke to slide easily on the cover. The hooks of the yoke are curved or otherwise shaped to fit the bead or flange usually provided on the rim of the cooking vessel, and the cross-bar of this yoke rests on the cover in position to impinge against the angular arms 31 of the closure-plate and to engage with the locking-tongue 28 of the strainer-plate.

The handle 36 is connected to the cover on the opposite side thereof to the slot or opening 20, and this handle is constructed to give a limited sliding movement to the cover and to engage with the rim of the vessel in a way to clamp said cover upon the vessel at the completion of its sliding movement thereon. The handle is shown as provided with a pintle portion 37, from which extend the cranks 38, that are bent to conform to the shape of the bead or flange on the cooking vessel. The handle is provided with the arms 39, and the loop of the handle lies at an angle to these arms. A hinge-loop 40 loosely embraces the pintle portion 36 of the handle, and said loop is riveted or otherwise fastened to the cover. The handle is pivotally mounted on the cover for its cranks to depend below the under side thereof, and the parts of the handle are so fashioned or arranged that the loop thereof will not rest flat upon the cover when the cranks are withdrawn from engagement with the vessel, thus preventing the looped portion of said handle from being heated unduly by the cover and minimizing the tendency of the handle to burn the hands of the operator in manipulating the cover.

The cover of my invention is fitted to a cooking vessel so that the slot or opening 20 therein lies immediately over the pouring-lip, thus adjusting the cover for the hooks of the yoke to lie on opposite sides of the lip and on one side of the vessel, while the clamping-handle lies on the opposite side of the vessel. The strainer-plate fits in the opening or slot of the cover, so as to be positioned over the vessel's lip, and the closure-plate rests flat upon the strainer-plate, so as to close the openings therein and minimize the escape of steam from the vessel while the food is being cooked. To drain the liquid contents from the food in the vessel without permitting the food to escape, the operator lifts the handle, so as to throw its cranks beneath the beaded rim of the vessel. This operation makes the cranks impinge against the vessel, so as to draw the cover across the latter, and such slidable adjustment of the cover causes the hooks of the yoke to engage with the beaded edge of the vessel. This engagement of the yoke with the vessel takes place before the cover completes its sliding movement under the manipulation of the handle, and as the cover completes its sliding movement the cross-bar of the yoke engages with the tongue of the strainer-plate and the free ends of the angular arms on the closure-plate, whereby the strainer is locked firmly in place over the lip and the closure-plate is raised to an inclined position, so as to expose the openings in the strainer-plate. The engagement of the hooks on the yoke with the cover and the cranks of the handle with the vessel operates to clamp the cover firmly upon the vessel, and the vessel may now be tilted to an inclined position by proper manipulation of the vessel-handle and the cover-handle, so as to pour off the liquid contents without permitting the escape of the solid food. The vessel may rest upon the stove or other surface, and the closure-plate may be returned to its proper position on the strainer-plate by gravity, this result being effected by slipping the cover across the vessel or by making the parts assume an inclined position. The strainer-plate, and with it the closure-plate, may be thrown back out of the way by turning the strainer-plate on the hinge 29, so that the parts will rest upon the cover in rear of the opening 20, and the two plates are thus adjustable simultaneously by hand.

In lieu of making the strainer-plate in a separate piece from the cover I may provide said cover with an integral perforated section 41, which constitutes the strainer portion of the cover. This requires the guides or loops for the yoke to be made in separate pieces, as at 42, and to be riveted, as at 43, upon the cover. The yoke is fitted slidably in the loops for its cross-bar to lie in rear of the closure-plate 44, the same being provided with an upstanding flange 45, from which extends an inclined lip 46. A slot or opening 47 is provided in this flange and the lip at the middle portion of the plate, and a separate hinge-plate 48 is riveted or otherwise fastened to the cover in position for the lips 49 of said plate to pass through the slot in the closure-plate, said lips being in opposite directions. The closure-plate is thus hingedly connected to the cover through the medium of the hinge-plate, and the lip 46 is disposed in the path of the cross-bar forming a part of the yoke, whereby the engagement of the yoke-hooks with the vessel and the slidable movement of the cover under the action of the handle 36 brings the lip of the closure-plate in engagement with the yoke, so as to lift the closure-plate to a raised position and expose the perforated strainer-section 41 of the cover.

In the embodiment shown by Figs. 9 and 10 of the drawings the cover is provided with the integral strainer-section; but the closure-plate has a direct hinged connection with the cover, and the yoke is pivotally mounted on said cover, so as to rock thereon in a manner to have engagement with the vessel and the closure-plate. Said plate is provided at its rear edge with an angular upstanding lip 50 and with the pivotal lugs 51, which are inserted in openings 52, formed in the cover, said lugs being disposed in pairs and bent in opposite directions in order to loosely connect the plate to the cover. The yoke 53 has the pivotal arms 54, mounted loosely in loops 55, which are riveted to the cover, and said yoke is furthermore provided with the depending cranks 56, which extend inwardly to engage with the beaded rim of the vessel when the cover is moved slidably by the handle. The engagement of the cranks 56 with the vessel depresses the cross-bar of the yoke into engagement with the angular lip of the closure-plate to raise the latter to its open position. This form of the yoke coöperates with the handle in clamping the cover upon the vessel.

In lieu of making the strainer-plate hingedly adjustable on the cover, as in Figs. 2 to 6, inclusive, I may slidably mount a strainer-plate 57 on the cover, as shown by Figs. 11 to 13, inclusive. This strainer-plate is provided with an extended shank 58, which is loosely fitted in a guide 59 in the cover, the rear end of the shank terminating in an upstanding finger-piece 60. The slidable plate is provided at its rear edge with the upstanding pivotal ears 61, which are disposed on opposite sides of the shank. The closure-plate 62 has a flange 63 at its rear edge, said flange having the slots 64, which receive bent portions of the pivotal ears 61, thus hingedly connecting the closure-plate to the strainer-plate. The plate 62 has its flange disposed in the path of the cross-bar on the slidable yoke, and the plate is furthermore provided with a stop-lip 65, adapted to impinge against the yoke when the plate is suddenly inverted, the free end of the plate resting on the finger-piece 60 when inverted. The operation of the hinged plate is similar to the construction shown by Figs. 1 to 6 in that the slidable movement of the cover makes the yoke lift or invert the closure-plate; but to move the strainer-plate so as to expose the opening or slot in the cover it is necessary to withdraw said strainer-plate by pressing against the finger-piece of its shank, such withdrawal of the strainer operating to invert the closure-plate because its flange 63 rides against the cross-bar of the yoke.

In the act of tilting the vessel equipped with the cover shown by Figs. 1 to 6 and with the strainer and its closure thrown back to the position shown by Fig. 4 the parts are prevented, in case of accidental falling forward, from completely closing the lip of the vessel by the locking-tongue 28 striking against the yoke. When solids are poured from the vessel, the cover is usually removed entirely therefrom, in which event by holding the front part of the cover upward the slidable yoke adjusts itself by gravity sufficiently for the tongue 28 to pass in front of the yoke, thus allowing the strainer-plate and the closure to fall back into the opening of the cover so as to close the same.

The slidable yoke performs four functions: First, it coöperates with the front part of the vessel so as to assist in clamping the cover thereto; secondly, the closure-plate is lifted when the cover is slidably adjusted; thirdly, it locks the strainer-plate in its closed position, and, finally, it stiffens the cover where it is weakened by cutting out a portion thereof to make the opening or slot 20, thus minimizing the tendency to break at the opening.

The operating-handle 26 has its cranks arranged to engage with the under side of the cover in a manner for the parts to be disposed compactly with relation to the cover, thus making provision for nesting a number of the covers closely together in packing the same for shipping. As a matter of fact, the other parts of the cover are made as flat as possible, so that they may be compactly arranged to facilitate shipment or storage thereof.

Changes within the scope of the appended claims may be made in the form and proportion of some of the parts while their essential features are retained and the spirit of the invention is embodied. Hence I do not desire to be limited to the precise form of all the parts as shown, reserving the right to vary therefrom.

Having thus described the invention, what I claim is—

1. An apertured vessel-cover provided with a relatively movable closure, and closure-actuating mechanism, said closure-actuating mechanism being operated by the movement of the cover to effect a change of relation of the closure with respect to the aperture in the cover.

2. The combination with a vessel, of a shiftable cover provided with an opening, a relatively movable closure designed to cover the opening, and closure-actuating means operated by the shifting movement of the cover to effect a change of relation between the closure and the opening through the cover.

3. A vessel-cover provided with a movable closure, a closure-actuating device capable of movement relative to the cover, and means for retaining said device in order to effect such relative movement and the consequent actuation of the closure through the movement of the cover.

4. The combination with a vessel, of an apertured shiftable cover, a hinged closure carried by the cover and designed to close the opening therein, and means operated by the shifting movement of the cover for effecting a change of relation between the closure and the opening in the cover.

5. The combination with a receptacle, and a movable cover, of a movable closure carried by the cover, and closure-actuating means engaging the receptacle.

6. A vessel-cover provided with a strainer, an imperforate hinged closure for said strainer, and means carried by the cover and operatively disposed to the hinged closure to lift the latter by a shiftable movement of the cover, as and for the purpose set forth.

7. A vessel-cover provided with a strainer, an imperforate hinged closure therefor, and a yoke mounted on the cover to have a limited movement thereon, said closure having a part disposed in the path of the yoke and adapted to be moved by said yoke to an open position on a limited movement of the cover itself, as set forth.

8. A vessel-cover provided at one side with a strainer, a hinged closure for said strainer, a handle connected to the other side of the cover and provided with means adapted to give a limited sliding movement to the cover, and a yoke in coöperative relation to the hinged closure for opening the latter on the slidable movement of the cover, as set forth.

9. A vessel-cover provided with a strainer, a handle mounted on the cover and having means for clamping the same upon, and shifting said cover with relation to, a vessel, a closure for the strainer, and a yoke also mounted on the cover in coöperative relation to the closure and having means for clamping the cover upon a vessel, as set forth.

10. A vessel-cover provided with a strainer, a clamping-handle pivoted on the cover substantially at the opposite side from the strainer and provided with the cranks adapted to engage with the vessel to clamp the cover thereon, a yoke also mounted on the cover adjacent to the strainer and having bent portions adapted for engagement with a vessel, and a closure arranged over the strainer and in operative relation to said yoke, as set forth.

11. A vessel-cover provided with an opening, a strainer shiftably connected with the cover to fit over said opening, a closure-plate having a hinged connection with the strainer, and means for moving the closure with relation to the strainer, as set forth.

12. A vessel-cover provided with an opening, a strainer having a shiftable connection with the cover, an imperforate closure hinged to the strainer to be shiftable therewith and having a limited movement independent of said strainer, and a yoke coöperating with the strainer and with the imperforate closure, as set forth.

13. A vessel-cover provided with an opening, a strainer hinged to the cover, a closure hinged to the strainer, and a yoke arranged to lock the strainer and to lift the closure, said yoke being arranged for engagement with a receptacle, as set forth.

14. A vessel-cover provided with an opening, a strainer shiftably connected with the cover, a closure hinged to the strainer, means connected with the cover for slidably moving the same on a vessel, and a yoke arranged to lock the strainer and to move the closure with relation to the strainer on the slidable movement of the cover, as set forth.

15. A vessel-cover provided with an opening, a strainer hinged thereto and having a locking-tongue, a closure connected to the strainer, and a yoke arranged to engage with the tongue of the strainer and also disposed in operative relation to the closure, as set forth.

16. A cover provided with an opening and with the loops or guides at the edges of said opening, a yoke slidably fitted in the loops or guides, a strainer having a shiftable connection with the cover, and a closure hinged to the strainer and provided with means disposed in the path of the cross-bar of said yoke, as set forth.

17. The combination of a cover provided with a strainer, a clamping and shifting handle connected with said cover, a hinged closure for the strainer, a shiftable yoke arranged to engage with the closure, and a vessel upon which the cover is fitted and with which the handle and the yoke are adapted to engage, as set forth.

18. The combination of a cover provided with a strainer, a vessel on which the cover is adapted to fit, a clamping-handle mounted on the cover to coöperate with the vessel, a yoke also connected with the cover to coöperate with the vessel, and a strainer-closure arranged to be lifted by said yoke, as set forth.

19. A cover provided with a strainer, a yoke shiftably mounted on the cover, and a hinged closure having inclined members disposed in the path of the yoke, as set forth.

In testimony that I claim the foregoing as my own I have hereto affixed my signature in the presence of two witnesses.

JOHN H. WILSON.

Witnesses:
SYLVESTER L. DERBY,
OLCOTT R. DERBY.